(Model.)

J. F. WHITNEY & M. R. HUBBELL.
BARBED FENCE.

No. 344,428. Patented June 29, 1886.

Witnesses:
Edward C Mann
Holmes Cushman

Inventors.
Joel F. Whitney
Myron R. Hubbell

UNITED STATES PATENT OFFICE.

JOEL F. WHITNEY AND MYRON R. HUBBELL, OF WOLCOTT, VERMONT.

BARBED FENCE.

SPECIFICATION forming part of Letters Patent No. 344,428, dated June 29, 1886.

Application filed May 28, 1885. Serial No. 166,977. (Model.)

*To all whom it may concern:*

Be it known that we, JOEL F. WHITNEY and MYRON R. HUBBELL, citizens of the United States, residing at Wolcott, in the county of Lamoille and State of Vermont, have invented a new and useful Improvement in Barbed Fencing, of which the following is a specification.

Our invention relates to an improvement in wire fences; and it consists in the combination of a series of separate links, each one of which has a bent portion extending at right angles to its length, with the rotary barbs, which are placed on the bent portions of the links, as will be more fully described hereinafter.

The object of our invention is to form the fence of a series of connected links, upon each one of which is placed a rotating barb which revolves on an axis at right angles to the link, so that when an animal runs against one of the barbs the barb will prick the skin, but by revolving will not tear the flesh.

Figure 1:
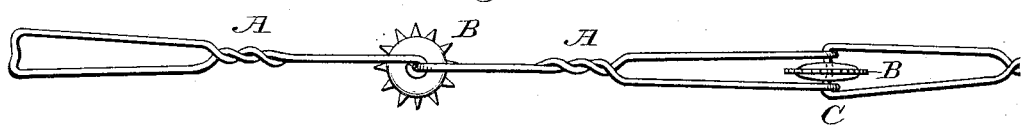
Figure 2:
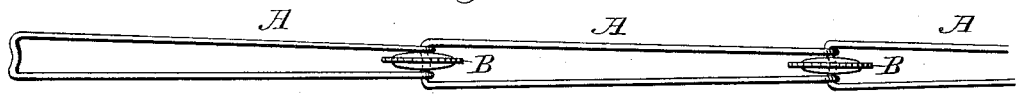
Figure 3:
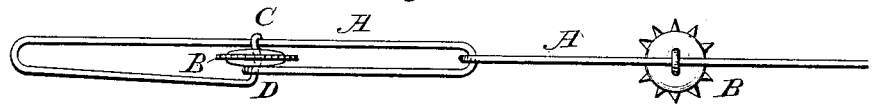

Figure 1 represents a side elevation of a portion of a wire fence embodying our invention, and showing a twisted link. Fig. 2 is a plan view of a portion of a fence composed of plain links. Fig. 3 is a similar view showing another form of link.

A represents the links, which may be twisted at or near their centers, so as to turn the axes C, on which the barbs B revolve at right angles to each other, as shown in Fig. 1, or the links may be plain, as shown in Figs. 2, 3. These links are joined together, as shown, and a barb is placed at the junction of every two links, or at the center of each link, as may be preferred. The axes upon which the barbs revolve are formed by turning some portion of a link at right angles to its length, and then placing the barb upon this bent portion, leaving the barb free to rotate. Where the links are twisted, as shown in Fig. 1, or formed as shown in Fig. 3, these axes are turned at right angles to each other and then the barbs extend both horizontally and vertically. Where plain links are used, as shown in Fig. 2, the barbs all project in the same direction. The barbs are circular, as here shown, and are made to freely revolve upon their axes when an animal runs against them, so as to prick the skin without tearing the flesh. The axes are concaved or bent at their centers, as shown, so that the strain upon the links will not cause the axes to bend and thus prevent the barb from turning. The twists in the links add firmness and strength to them, as well as turning the axes at right angles to each other.

Having thus described our invention, we claim—

A wire fence composed of a series of separate links, A, each one of which has a bent portion extending at right angles to its length, with the rotating barb B, which is placed upon this bent portion, substantially as shown.

JOEL F. WHITNEY.
MYRON R. HUBBELL.

Witnesses:
EWARD C. MAURE,
HOLMES CUSHMAN.